Figure 1:
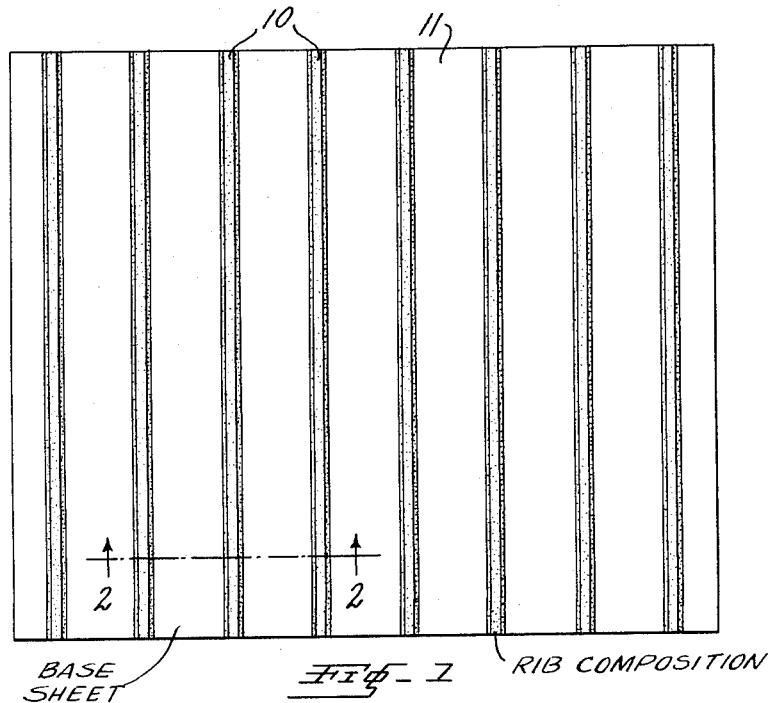

INVENTOR.
JAMES F. LITTLE
BY James J. Long
AGENT

United States Patent Office 3,228,803
Patented Jan. 11, 1966

3,228,803
BATTERY SEPARATOR EMBODYING RIBS APPLIED FROM A COMPOSITION OF PLASTISOL AND AQUEOUS PHENOLIC RESIN
James F. Little, Greenville, R.I., assignor to United States Rubber Company, New York, N.Y., a corporation of New Jersey
Filed Dec. 5, 1962, Ser. No. 242,512
7 Claims. (Cl. 136—145)

This invention relates to a ribbed battery separator for a lead-acid electric storage battery, and more particularly it relates to a battery separator embodying ribs applied from a composition comprising a plastisol and a liquid thermosetting resin.

Battery separators are sheets of acid-resistant microporous material (e.g., microporous hard rubber, resin bonded cellulosic pulp, sintered or microporous polyvinyl chloride) that are placed between the electrodes or plates of an electric storage battery to separate and properly space the plates while still permitting passage of electric current between the plates, that is, interchange of ions through the liquid electrolytic bath in which the plates and separators are immersed and which permeates and wets the separators. It is conventional to provide ribs on the battery separator to provide the desired spacing between the plates without unduly increasing the electrical resistance offered by the separator. Nearly all such conventional ribbed battery separators fall into two general classes: (1) Embossed rib types, such as resin-pulp type which has an essentially uniform thickness across its entire width and is hollow behind each rib, and (2) so-called solid rib types which are virtually flat across their backs and have upstanding ribs of either the same material as the body of the separator or of another material.

The first class of separator, in the form previously known, suffers from a serious disadvantage in that at the point of greatest abrasion (occasioned by vibration and rubbing of the separator against the battery plate in use), the separator is rather thin and will wear through rather quickly.

The second class, the "solid rib" type, is preferable in certain respects, but unifortunately the solid rib separators previously proposed have had various disadvantages. Either the ribs tended to be unduly stiff and brittle or they had a tendency to heat soften at elevated temperatures and become distorted or flattened. The latter shortcoming is particularly important in certain battery manufacturing operations. For example, in certain battery dry-charging processes, completed battery cells, with separators in place, are dried at temperatures as high as 350° F. Under these conditions the pressure applied to the cell during drying and removal from the drier will cause flattening of the ribs resulting in loose fitting separators and defective cells or batteries. In addition, during some lead burning operations involved in battery manufacture separators can reach temperatures that will caues rib flattening or distortion.

Accordingly, a principal object of the invention is to provide a battery separator having ribs which have a high heat distortion point.

Another object is to provide a ribbed battery separator of the kind described in which the ribs are flexible.

Still another object of the invention is the provision of a battery separator rib composition having improved adhesion to the separator.

Figure 2:
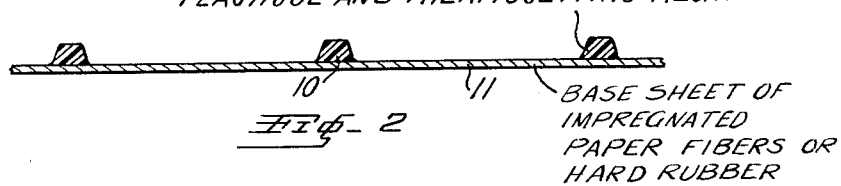
Figure 3:
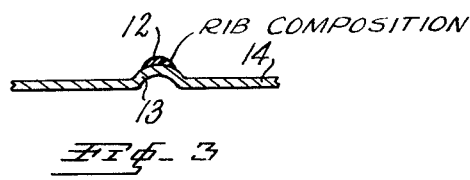

In the accompanying drawing,
FIG. 1 is a plan view of a battery separator of the invention;
FIG. 2 is a fragmentary sectional view, on a larger scale, taken along the line 2—2 of FIG. 1; and,
FIG. 3 is a view similar to FIG. 2, of a modification of the invention.

In one important aspect, the invention may be regarded as an improvement in ribbed battery separators of the kind described in U.S. Patent 2,936,328, Sillcox et al., May 10, 1960, or Canadian Patent 581,120, issued April 11, 1959, to the same inventors. In the latter patent an aqueous rib-forming paste containing a phenol-formaldehyde resin or a plastisol, and a porous filler, is applied in the form of strips to the surface of a partially cured battery separator comprising a resin-impregnated cellulosic sheet, and the assembly is then cured. Unfortunately, it has not heretofore been possible to provide in this fashion a ribbed battery separator which would be free of the disadvantages referred to previously.

In another important aspect, the invention is directed to a battery separator of the embossed kind, having an improved rib composition deposited either in the hollow portion of the rib, or, more preferably, having an improved rib composition deposited on the raised or peak portion of the embossed rib.

The present invention is based on the surprising and unexpected discovery that a battery separator rib composition, comprising a mixture of a porous filler with a two-phase binder which is a blend of a thermosetting resin and a plastisol, is capable of providing superior, improved ribs that overcome serious disadvantages associated with prior battery separatory ribs, and that provide new advantages in the form of greater resistance to deformation at elevated temperatures in combination with desirable flexibility, improved adhesion to various kinds of battery separators, and ease of manufacture because of the speed with which the ribs harden after curing without requiring excessive cooling time. The latter is an important advantage because it allows the grinding to thickness operation (a conventional step in manufacturing battery separators) to be performed faster and more accurately. In one preferred form of the invention the described novel rib-forming paste is deposited on the tops or ridges of ribs embossed in the separator.

The present invention therefore provides ribs that are essentially thermosetting but which are not brittle like the usual thermoset products. The present rib material may be applied to many web or backing materials (microporous sheets intended to be cut up into battery separators), either in flat form or with embossed or otherwise formed ribs, including resin impregnated paper (U.S. Patents 2,662,106 and 2,662,107, Uhlig et al., December 8, 1953), microporous rubber, and various thermoplastic materials particularly if supported during the cure of the ribs.

The rib materials of the present invention are essentially blends of plastisol and liquid thermosetting resin such as phenol-formaldehyde resins, unsaturated polyester/copolymerizable monomer compositions, urea-formaldehyde resin, or any other liquid thermosetting material.

The plastisol employed in the invention is a well-known material, being a pasty or fluid mix of finely powdered thermoplastic resin, especially a vinyl resin (notably polyvinyl chloride resin or equivalent vinyl resin made by copolymerizing vinyl chloride with minor amounts of copolymerizable monomers such as vinyl acetate, vinylidene chloride, or diethyl maleate) suspended or dispersed in a liquid plasticizer in which the resin particles are essentially insoluble or only slowly soluble at ordinary ambient temperatures, but which is capable of dissolving the resin at elevated temperatures, forming upon sufficient heating a homogeneous, fused, integral, single-phase mass that is solid and strong, but flexible, when cooled to room temperature. Any known plasticizer or combination of plasticizers, conventionally used for making plastisols, may be used in preparing the plastisol for use in the present invention. By way of non-limiting example there may be mentioned such plasticizers as ester-type plasticizers such as dioctyl phthalate, butyl benzyl phthalate, polymeric (non-hardenable, devoid of ethylenic unsaturation) plasticizers such as propylene glycol sebacate, alkylated aromatic petroleum hydrocarbon fractions, alkylated benzene, and the like. The relative quantities of resin and plasticizer used in the plastisol may be in accordance with conventional practice, for example, from 30 parts or less to 150 parts or more of plasticizer per 100 parts by weight of resin. The usual stabilizers or other conventional compounding ingredients commonly used in plastisols may also be included. It will be understood that although the initially fluid plastisol is gelled and fused by heat, thereby being converted into a state in which it is strong and solid at ordinary temperatures, the fused plastisol is nevertheless basically a thermoplastic material, that is, upon being reheated it becomes soft and readily deformable or moldable, unlike thermosetting compositions which become truly infusible and cannot be softened by heat to a condition in which they are remoldable. It will be understood that even a plastisol based on a polyester plasticizer is truly thermoplastic because such polyester plasticizer does not become cross-linked or insoluble and infusible in the course of fusion of the plastisol, since the plasticizer is not ethylenically unsaturated and there is no unsaturated monomer and no polymerization catalyst (both of which are ordinarily required to convert an unsaturated polyester to the cured state) present in the plastisol to cure the polyester plasticizer. In this respect, the polymeric polyester plasticizer optionally present in the plastisol may be referred to as an inert or thermoplastic plasticizer.

For purposes of the invention, the plastisol is, as indicated, mixed with a liquid thermosetting resin composition, among which the phenol-formaldehyde resins may be singled out as especially suitable. Particularly suitable are the water-dilutable, heat-curable phenol-formaldehyde resins, which are subsequently cured to an insoluble, infusible state by the action of heat during the cure of the ribs.

The unsaturated polyester resin/copolymerizable monomer compositions represent a preferred kind of thermosetting resin for mixing with the plastisol to make the rib composition of the invention. These are well known materials, typically based on a polyester which is a self-condensation product of an ester of a polyhydric alcohol with a polycarboxylic acid, at least one of which is unsaturated. Frequently the unsaturated polyester is made from one or more glycols and one or more alpha, beta-ethylenically unsaturated polycarboxylic acids. By way of non-limiting example, it may be mentioned that polyesters can be prepared from such acids as maleic, fumaric, aconitic, mesaconic, citraconic, ethylmaleic, pyrocinchoninic, veronic or itaconic acid (with or without such acids as adipic, succinic, sebacic, phthalic, etc., or such acids as linolenic, linoleic, elaeosteric, etc.) with such glycols as ethylene, diethylene, triethylene, polyethylene, 1,3-propylene, 1,2-propylene, dipropylene (1,3 or 1,2), butylene or styrene glycol. Copolymerizable monomers suitable for mixing with such unsaturated polyesters to produce a thermosetting composition are well known, and they may be described as ethylenically unsaturated materials. Representative monomers of this kind include styrene, vinyl toluene, methyl methacrylate, vinyl acetate, diallyl phthalate and triallyl cyanurate. As is well understood by those skilled in this art, such compositions of unsaturated polyester resin and copolymerizable monomer are capable of curing or cross-linking to an insoluble, infusible, thermoset condition, under the influence of conventional free-radical polymerization catalysts such as organic peroxides, including not only benzoyl peroxide and tertiary butyl hydroperoxide, but also the so-called ketone peroxides. Those skilled in the art of compounding these resins will appreciate the fact that they may also contain inhibitors (e.g. hydroquinone) to prevent them from curing prematurely during shipment and storage, and that resort may be had to various promoting substances (e.g. cobalt compounds, mercaptans) to aid the curing reaction. Frequently the polyester/monomer compositions comprise 20% to 95% by weight of polyester and correspondingly 80% to 5% by weight of copolymerizable monomer.

It is a remarkable feature of the invention that the heat distortion point and flexibility of the finished rib can be varied widely merely by changing the ratio of thermosetting resin to plastisol. The higher the ratio the higher the heat distortion temperature and the less the flexibility; the lower the ratio the lower the heat distortion temperature and the greater the flexibility. I have found that the best ratio of thermosetting resin to plastisol resin is about 40–50% by weight thermosetting resin to correspondingly about 60–50% of plastisol resin. Amounts of thermosetting resin as low as 30% produce ribs with a higher heat distortion point than ribs based on either a plastisol or unplasticized vinyl resin. (In the case of the thermosetting phenolic resin, the percentage figures refer to the weight of cured, solid resin; in the case of the polyester resin composition the percentage figures refer to the polyester plus copolymerizable monomer. In the case of the plastisol, the percentage resin figures refer to the resin itself, without the plasticizer.)

In order that the ribs of the invention will not increase unduly the electrical resistance of the separator, the rib composition further includes a finely divided porous filler which is intimately mixed with the plastisol thermosetting resin blend. Porous fillers of a hydrophillic nature are preferred (to promote easy wetting of the ribs), and such materials as hydrous silica gel (containing, for example, 60 to 75% water) or dehydrated vitreous silica gel, bentonite, terra alba, and the like, may be mentioned as suitable porous fillers. Additional fillers or additives (e.g., clays, silica) may be added to control viscosity and lower costs or to confer a thixotropic nature upon the uncured rib compound. The rib composition of the invention may contain from 50 to 200 parts of porous finely powdered filler, per 100 parts of plastisol resin plus thermosetting resin.

Water in the rib-forming composition aids in conferring porosity and allows fillers to be added without increasing the viscosity excessively. Water may be added to the rib-forming composition in the case of the polyester-plastisol blend; in the case of the phenolic resin-plastisol blend water is included in the phenolic resin as purchased. The amount of water may range up to about 65 parts per 100 parts of total resin (typically 50–65 parts of water per 100 parts resin in the phenolic resin-plastisol mix, and 0–25 parts of water per 100 of resin in the polyester-plastisol mix).

The uncured rib composition as described typically has the consistency of a spreadable or extrudable paste and it may be applied in the form of suitably spaced strips of appropriate thickness and width to the base battery separator sheet. It is a characteristic of the composite plastisol-thermosetting resin paste that it can be cured to a solid state by heating, under conditions conventionally used for curing thermosetting resins or fusing plastisols, suitably for example at a temperature of from about 500° F. to about 350° F. for a period of from about 45 seconds to about 30 minutes, it being understood that the time and temperature of cure will usually be inversely related, and that the optimum combination of time and temperature in any given case will depend upon such variables as the exact composition of the rib paste, the degree of cure desired, the character of the heating device, etc. During the cure the water present will of course be driven off. In the final cured state the structure of the present ribs is a unique combination of two separate intertwined polymer phases, namely, the thermoplastic plastisol phase and the thermoset resin phase. Distributed uniformly throughout both of these phases is the powdered filler which renders the ribs porous. From heat compression test studies it is concluded that there are at least two separate phases in the rib, one being a continuous thermoset resin phase or matrix which contributes to the high heat distortion temperature and the other being a plastisol phase that contributes the flexibility. It is not fully understood why both high heat distortion and good flexibility are obtained but both properties can be varied by varying the ratio of thermoset resin to plastisol in accordance with the invention.

The rib paste may be applied to either uncured, semi-cured or completely cured resin-pulp sheet. Better rib adhesion is obtained if applied to uncured or semi-cured sheet. In the case of application to microporous hard rubber, the rubber is cured prior to the rib application.

The rib paste may be applied to the base sheet in any convenient manner with the aid of conventional apparatus, such as an extrusion device, or a bar or blade of suitable shape.

The following examples, in which all quantities are expressed by weight, will serve to illustrate the practice of the invention in more detail.

Example 1

A paste or slurry of the following composition is prepared in a ribbon type mixer:

A.

| | Parts by weight |
|---|---|
| Terra alba | 130.0 |
| Hydrous silica gel (25% total solids) | 17.2 |
| Bentonite | 4.3 |
| Caustic soda | 0.5 |
| Water | 75.8 |
| | 227.8 |

To this slurry 171 parts of the following plastisol is added with stirring:

B.

| | |
|---|---|
| Polyvinyl chloride resin powder | 100 |
| Primary plasticizer [1] | 55 |
| Secondary plasticizer [2] | 13 |
| Lead carbonate | 3 |
| | 171 |

To this mixture of slurry and plastisol is added:

C.

| | |
|---|---|
| Polyester resin composition [3] | 171.00 |
| Catalyst [4] | 3.42 |
| | 174.42 |

[1] E.g., dioctyl phthalate.
[2] Optional. E.g., alkylated petroleum fractions are disclosed in "Technology of Solvents and Plasticizers," Doolittle, pages 1018–19, "S/V Solvaloid C," "Paraflex BN–1"; alkylated benzene of molecular weight 280, specific gravity 0.8715, "Conoco H-35."
[3] E.g., mixture of 30% styrene, 70% diethylene glycol maleate, "Hetron #72," or similar resin.
[4] E.g., 50% benzoyl peroxide, "Luperco ATC."

Referring to the drawing, ribs 10 of the final mix are applied to a sheet 11 of phenolic resin impregnated cotton linters (prepared, for example, in accordance with the example in Uhlig et al., 2,662,106) while such sheet is in an uncured condition. The resulting ribbed sheet is cured in a circulating hot air oven under conditions ranging from 60 seconds at 425° F. to 90 seconds at 450° F. The resulting cured ribs are hard but flexible. They are harder than conventional plastisol ribs at every curve level.

In a preferred modification of the invention, shown in FIG. 3, the rib composition 12 is applied to the tops of embossed ribs 13 of a paper battery separator 14.

The rib compound of this example also produces a good hard rib with good adhesion when applied to a web of previously cured hard rubber (prepared, for example, in accordance with Example A of Baty and Meyer, U.S. Patent 2,329,322, Sept. 14, 1943) and cured 60 seconds at 450° F.

Example 2

The following materials were mixed in a Hobart mixer:

| | Parts by weight |
|---|---|
| Terra alba | 130 |
| Hydrous silica gel (25% total solids) | 17.2 |
| Bentonite | 4.3 |
| Caustic soda | 0.5 |
| Phenol-formaldehyde resin [4] | 125.0 |
| Plastisol [5] | 96.0 |
| Clay | 25.0 |

[4] Water-soluble A-stage phenol-formaldehyde resin, 50% total solids, "Durez Resin #19,811."
[5] Same formulation as B in Example 1.

This compound is applied as ribs to a sheet of resin-impregnated cotton linters and cured 45 to 90 seconds at 500° F. in a circulating hot air oven. A very hard, flexible rib is obtained at all cure levels.

To illustrate the superior heat distortion characteristics of the just-described rib material it was subjected to a compression test in a circulating hot air oven at 350° F. along with a rib of conventional plastisol compound containing no thermosetting resin. The ribs were in the shape of isosceles triangles 0.060 inch at the base and 0.080 500° F. and allowed to cool. They were then placed in a Williams plastometer that had been brought to 350° F. in an oven. The plastometer imposed a dead weight of 2 kilograms over 4¼ inch of rib length. After one minute in the plastometer at 350° F. the solely plastisol rib had been compressed 0.045 inch in height while the rib of the invention composed of plastisol plus phenolic resin was compressed only 0.005 inch.

A further advantage of the plastisol-phenolic resin type rib is its superior adhesion to the phenolic resin impregnated cotton linters. When both the rib and web (i.e. the separator) are cured simultaneously a true continuous phase of phenolic resin is established between the rib and web resulting in an integral web and rib junction.

The results obtained with the composite thermoset-plastisol rib of the invention are in contrast to the results obtained if it is attempted to make the ribs of a thermoset resin, such as a phenolic resin, alone. In such cases the ribs are too brittle to be practical, and snap off at the slightest flexing action.

From the foregoing it will be apparent that the invention provides a ribbed battery separator having many unusual advantages. The ribs have a higher heat distortion temperature making them markedly more dimensionally stable when subjected to high temperatures, particularly in certain battery manufacturing processes such as drying during dry-charge battery manufacture. The adhesion of the ribs to the web is better than in the usual non-integral rib separators. The ribs of the present invention add more stiffness to the separator than do other ribs of the non-integral type.

The form of the invention in which the rib-forming paste is applied to embossed ribs, as shown in FIG. 3, is particularly advantageous from the standpoint of economy in use of rib-forming paste, and the speed with which cure can be effected (because of the relatively thin cross section of paste, e.g., in the form of thin bands perhaps only 0.05 to 0.1 inch wide, standing perhaps only 0.005 to 0.025 inch high off the tops of the ribs). Lower packaging costs (more compact stacking) and better cold starting properties can also be associated with this form of the invention. It will therefore be apparent that when reference is made in the foregoing specification, and the appended claims, to ribs made of the present composition, it is intended that either the entire rib may be made of such composition on a flat backing, or only a portion of the rib may be made of such composition, applied to a suitably embossed backing.

Having thus described my invention, what I claim and desire to protect by Letters Patent is:

1. A battery separator rib comprising one phase which is a fused, homogeneous plastisol, and a second phase, intertwined with the first-mentioned phase, which second phase is a cured phenol-formaldehyde resin, and a porous particulate filler distributed throughout said phases.

2. A battery separator comprising a base sheet comprising phenolic-resin impregnated paper fibers, and ribs superimposed on said base sheet, said ribs comprising one phase which is a fused, homogeneous plastisol, and a second phase, intertwined with the first-mentioned phase, which second phase is a cured phenol-formaldehyde resin, and a porous particulate filler distributed throughout said phases.

3. A battery separator comprising a microporous hard rubber base sheet, and ribs superimposed on said base sheet said ribs comprising one phase which is a fused, homogeneous plastisol, and a second phase, intertwined with the first-mentioned phase, which second phase is a cured phenol-formaldehyde resin, and a porous particulate filler distributed throughout said phases.

4. A method of making a ribbed battery separator comprising providing a plastisol composition, providing a thermosetting resin composition which is an uncured aqueous phenol-formaldehyde resin, mixing said compositions to form a two-phase mixture, the said mixture containing a porous particulate filler, applying the mixture in the form of ribs to a battery separator, and heating the resulting assembly to drive off the water, fuse the plastisol and cure the thremosetting resin.

5. A method as in claim 4 in which the battery separator to which said ribs are applied is a sheet of phenolic resin impregnated paper fibers.

6. A method as in claim 4 in which the battery separator to which said ribs are applied is a microporous hard rubber sheet.

7. A method of making a ribbed battery separator comprising providing a plastisol composition, providing a thermosetting resin composition, which is an uncured aqueous phenol-formaledhyde resin, mixing said compositions to form a two-phase mixture, the said mixture containing a porous particulate filler, applying the mixture to the tops of ribs of an embossed battery separator base, and heating the resulting assembly to drive off the water, fuse the plastisol and cure the thermosetting resin.

References Cited by the Examiner

UNITED STATES PATENTS

| | | | |
|---|---|---|---|
| 2,707,201 | 4/1955 | Fernald et al. | 136—146 |
| 2,862,988 | 12/1958 | Dillehay et al. | 136—146 |
| 2,936,328 | 5/1960 | Sillcox et al. | 136—145 |
| 3,011,909 | 12/1961 | Hart et al. | 117—72 |
| 3,061,659 | 10/1962 | Wilke et al. | 136—90 |

WINSTON A. DOUGLAS, *Primary Examiner.*

MURRAY TILLMAN, *Examiner.*